Patented Mar. 7, 1950

2,499,822

UNITED STATES PATENT OFFICE 2,499,822

PRODUCTION OF DIPHENYL SULFOXIDE

Everett E. Gilbert, New York, and Howard D. Segool, Flushing, N. Y., assignors to Allied Chemical & Dye Corporation, a corporation of New York No Drawing. Application February 20, 1947, Serial No. 729,891

3 Claims. (Cl. 260—607)

This application relates to production of diphenyl sulfoxide.

Diphenyl sulfoxide has been prepared from diphenyl sulfide on a laboratory scale by electrolytic oxidation, and by oxidation with hydrogen peroxide or nitric acid. The electrolytic oxidation technique requires expensive equipment and is unsuited for commercial operation; production of the sulfoxide employing hydrogen peroxide as a reactant is also too expensive to be commercially attractive. Use of nitric acid, on the other hand, gives poor yields of a highly colored sulfoxide product. Diphenyl sulfoxide has also been prepared by hydrolyzing the dichloride of diphenyl sulfide; however, the preparation and isolation of the dichloride render this process uneconomical.

It is an object of this invention to provide an economical, commercially attractive process for producing diphenyl sulfoxide in high yields.

In accordance with this invention diphenyl sulfide is contacted with gaseous chlorine in the presence of not less than 1 mol of water per mol of diphenyl sulfide at a temperature between about 0° and about 100° C., until about 1 mol of chlorine, per mol of diphenyl sulfide, has reacted. By operating under these specific conditions, we have found high purity diphenyl sulfoxide may be directly produced in good yields of between 80 and 95% of thoretical, based on the sulfide; our process, therefore, provides a simple, effective and economic method for preparing this substance on a commercial scale.

The process of our invention may suitably be carried out by agitating a mixture of diphenyl sulfide and not less than 1 mol, preferably between about 10 and about 20 mols, of water, per mol of sulfide, while introducing chlorine into the mixture. If desired, a solvent for the diphenyl sulfide such as benzene, petroleum naphtha or carbon tetrachloride, may be incorporated in the reaction mixture in amounts which may vary between about 50 and about 200% by weight of the sulfides; we have found use of such solvents in accordance with this invention is not necessary and, accordingly, prefer to dispense therewith. The temperature of the reaction may vary between about 0° and about 100° C., temperatures between 10° and 40° C. preferably being employed; if solvents such as benzene are included in the reaction mixture the temperature should not exceed the boiling point thereof. The reaction may be carried out in an acid, neutral or alkaline medium, an initially neutral reaction medium being preferred. Introduction of chlorine into the reaction mixture is continued until about 1 mol thereof, per mol of diphenyl sulfide, has reacted, since under such conditions, we have found, optimum yields of diphenyl sulfoxide are obtained.

The diphenyl sulfoxide may be recovered from the reaction mixture in any suitable manner. Thus at the completion of the reaction the aqueous dilute hydrochloric acid layer may be withdrawn, and the sulfoxide product washed with water and dilute alkali and fractionally distilled.

The following examples are illustrative of our invention; amounts are given in parts by weight:

*Example 1.*—75 parts of diphenyl sulfide and 75 parts of water were vigorously stirred and chlorine gas was passed thereinto at temperatures between 25° and 40° C. until 30 parts of chlorine had been absorbed. At the end of this time the reaction mixture was diluted with 300 parts of water and made alkaline by the addition of solid potassium carbonate. An oily layer separated, which was filtered, washed, dried and fractionally distilled to give 59 parts of diphenyl sulfoxide having a setting point of 63° C., representing a 94.7% yield.

*Example 2.*—186 parts of diphenyl sulfide, 333 parts of water and 200 parts of benzene were mixed with vigorous agitation and 72 parts of chlorine gas were passed into the mixture over a period of about one hour, the temperature being maintained between 10° and 14° C. Chlorine addition was then discontinued, the temperature permitted to rise to about 25° C. and agitation continued for an additional 30 minutes. The benzene layer was then separated, washed and distilled, 184.6 parts of diphenyl sulfoxide having a setting point of 68.5° C. being obtained, representing a 91.4% yield.

*Example 3.*—93 parts of diphenyl sulfide, 186 parts of water, 186 parts of benzene and 69 parts of potassium carbonate were vigorously agitated and 40 parts of chlorine gas were passed thereinto over a period of 45 minutes, the temperature being maintained at 10° to 15° C. The mass was then stirred for an additional 30 minutes. At the end of this time the benzene layer was separated, washed and distilled, 94.5 parts of diphenyl sulfoxide being obtained, representing a 93.4% yield.

*Example 4.*—186 parts of diphenyl sulfide and 220 parts of 36% hydrochloric acid were mixed and 75 parts of chlorine passed into the mixture over a period of 75 minutes at a temperature between 16° and 22° C. At the end of this time the reaction mass was poured into water and extracted with benzene; the benzene extract was washed, dried and distilled. 167 parts of diphenyl sulfoxide were obtained, representing a 82.5% yield.

*Example 5.*—124 parts of diphenyl sulfide, 193 parts of water and 98 parts of benzene were vigorously stirred and 46.7 parts of chlorine passed thereinto at a temperature of 75° to 82° C. The benzene layer was then separated, washed with water and dilute sodium carbonate solution and distilled, a 74.3% yield of diphenyl sulfoxide having setting point of 70° C. being obtained.

Since certain changes may be made in carrying out the above process without departing from the scope of the invention, it is intended that all matter contained in the above description shall be interpreted as illustrative and not in a limiting sense.

We claim:

1. A process for the manufacture of diphenyl sulfoxide which comprises contacting diphenyl sulfide with gaseous chlorine in the presence of not less than 1 mol of water, per mol of sulfide, at a temperature between about 0° and about 100° C. only until about 1 mol of chlorine, per mol of sulfide, has reacted.

2. A process for the manufacture of diphenyl sulfoxide which comprises agitating diphenyl sulfide with between about 10 and about 20 mols of water, per mol of sulfide, at a temperature between about 10° and about 40° C. while introducing chlorine gas into the mixture only until about 1 mol of chlorine, per mol of diphenyl sulfide, has reacted, and recovering the diphenyl sulfoxide produced.

3. A process for the manufacture of diphenyl sulfoxide which comprises agitating diphenyl sulfide with between about 10 and about 20 mols of water, per mol of sulfide, in the presence of a solvent for the sulfide, at a temperature between about 10° and about 40° C. while introducing chlorine gas into the mixture only until about 1 mol of chlorine, per mol of diphenyl sulfide, has reacted, and recovering the diphenyl sulfoxide produced.

EVERETT E. GILBERT.
HOWARD D. SEGOOL.

REFERENCES CITED

The following references are of record in the file of this patent:

UNITED STATES PATENTS

| Number | Name | Date |
|---|---|---|
| 2,385,899 | Weijlard et al. | Oct. 2, 1945 |

OTHER REFERENCES

Chem. Abs. (1941), 35: 6973.

Dunstan et al., "The Science of Petroleum," vol. III, pages 1732–1734, Oxford University Press, New York, 1938.